United States Patent
Watanabe et al.

(10) Patent No.: US 8,065,516 B2
(45) Date of Patent: Nov. 22, 2011

(54) HARD DISK DRIVE WITH CERTIFICATION FUNCTION

(75) Inventors: Yoshiju Watanabe, Kanagawa (JP);
Tatsuya Hirai, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1027 days.

(21) Appl. No.: 11/528,958

(22) Filed: Sep. 27, 2006

(65) Prior Publication Data

US 2007/0083704 A1  Apr. 12, 2007

(30) Foreign Application Priority Data

Sep. 29, 2005 (JP) ................................. 2005-285135

(51) Int. Cl.
*H04L 29/00* (2006.01)
(52) U.S. Cl. .......... 713/156; 713/173; 713/175; 726/10; 380/30; 380/282; 380/285
(58) Field of Classification Search .................. 713/156, 713/173, 175; 380/30, 282, 285; 726/10
See application file for complete search history.

(56) References Cited

U.S. PATENT DOCUMENTS

| 2003/0161064 | A1* | 8/2003 | Hori et al. ......................... 360/55 |
| 2004/0003239 | A1* | 1/2004 | Ohmori et al. ................. 713/158 |
| 2006/0234797 | A1* | 10/2006 | Davis et al. ..................... 463/43 |

OTHER PUBLICATIONS

Haruko Takano, Tatsuya Hirai and Yukihide Inagaki, The outline of content protection technology for a removable storage, IEIC Technical Report (Institute of Electronics, Information and Communication Engineers), 2005, vol. 104, No. 652, pp. 5-10, Japan.

Tatsuya Hirai, Content protection technology for a novel removable drive, IEEE Transactions on Magnetics, Issue Date: Feb. 2005, vol. 41, Issue: 2, pp. 860-869, published by IEEE Magnetics Society, USA.

* cited by examiner

*Primary Examiner* — Helai Salehi
(74) *Attorney, Agent, or Firm* — Patterson & Sheridan, LLP (57) ABSTRACT

A magnetic disk drive is provided capable of reducing a processing load even in a mode of, for example, reproduction during recording. In one embodiment, a magnetic disk drive includes a storage unit for storing certificate information that relates to the magnetic disk drive and corresponds to a root key of a certification organization. The certificate information is used on the host side to perform authentication processing of the magnetic disk drive.

18 Claims, 4 Drawing Sheets

HARD DISK DRIVE WITH CERTIFICATION FUNCTION

CROSS-REFERENCES TO RELATED APPLICATIONS

This application claims priority from Japanese Patent Application No. JP2005-285135, filed Sep. 29, 2005, the entire disclosure of which is incorporated herein by reference.

BACKGROUND OF THE INVENTION

The present invention relates to a magnetic disk drive such as a hard disk drive, and to an information recording system such as a hard disk recorder that uses the magnetic disk drive.

In recent years, various kinds of data including television programs are in general written to hard disks. On the other hand, recording of copyrighted data has required a function of preventing the written data from illegally flowing out or other similar functions. For example, at the time of recording a digital television broadcast, it is not permitted to record a plurality of contents each of which continues one minute or more. For this reason, if data whose length is one minute or more is recorded, an encryption key (issued as license information) is changed at intervals of one minute so that a plurality of keys are not allowed to be used all at once. This is one technique to observe this constraint.

Heretofore, when such a key is changed, the PKI (public key encryption infrastructure) technology which has been developed in parallel with the network technologies is in general used.

Figure 6:
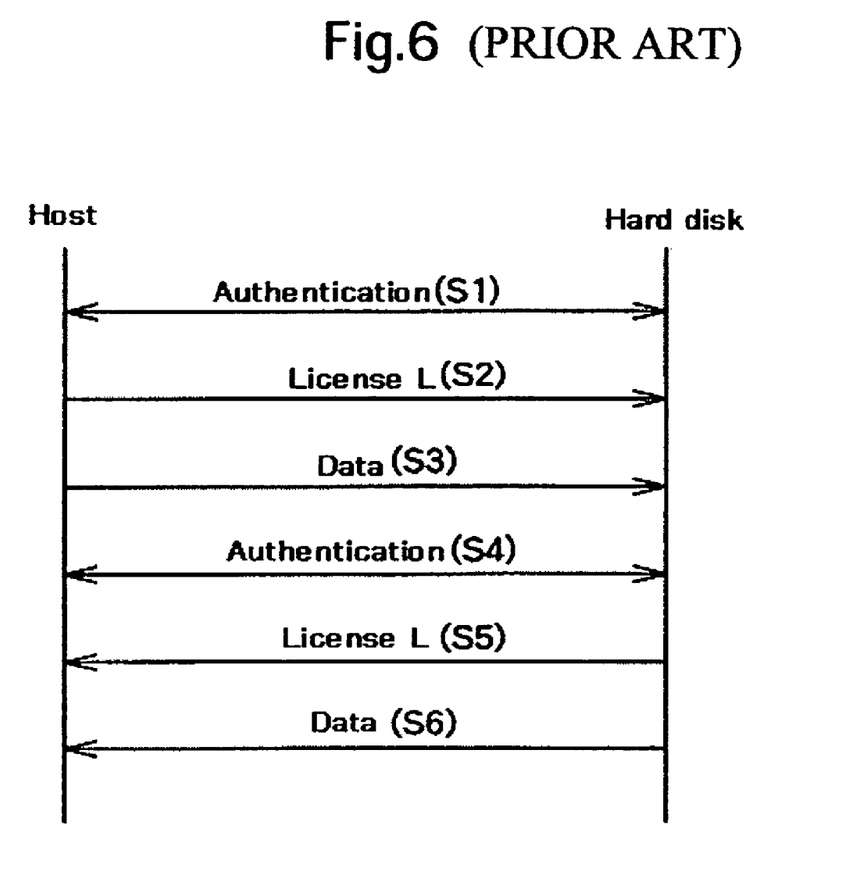

To be more specific, as shown in FIG. 6, in the conventional equipment, a host as a hard disk recorder main body authenticates a hard disk as a recording medium, and then transmits an encryption key to the hard disk (S1). Next, the host transmits encrypted license information L (information used to decrypt content data, and the like) to the hard disk (S2) and then transmits data (S3). The hard disk checks this license information L, and writes the data. In addition, there is a request for reproduction concurrent with recording. In this case, subsequent to the writing of the data, the hard disk authenticates the host and then transmits an encryption key (S4). Next, the hard disk transmits encrypted license information L (S5), and then transmits data that has been read out (S6). The host decrypts the read data by use of the license information L to perform reproduction processing. In this conventional example, it is necessary to repeat the above processing from the step S1 before the next data is written. These steps are similar to implementation of the PKI technology in the network.

However, if the conventional steps are used, when reproduction is made concurrently with recording, data with a relatively large amount of information, including information used for authentication and encryption key information, is continuously transmitted and received between the host and the hard disk, in addition to data to be recorded and data to be reproduced. In addition, the length of time required for the authentication processing of the authentication information and the length of time required for encryption and decryption processing of the encryption key are relatively long. Therefore, it is not possible to improve the performance of recording and reproduction.

BRIEF SUMMARY OF THE INVENTION

The present invention has been made in view of the foregoing. One feature of the present invention is to provide a magnetic disk drive capable of reducing a processing load even in a mode of such reproduction concurrent with recording, and an information recording system.

In order to solve the problems described in the conventional example, a magnetic disk drive of the disk drive is characterized by comprising a storage unit for storing certificate information relating to the magnetic disk drive, the certificate information corresponding to a root key of a certification organization, wherein the certificate information is used on the host side to perform authentication processing of the magnetic disk drive.

The magnetic disk drive according to the present invention is characterized by comprising a storage unit for storing a public root key corresponding to a secret root key of a certification organization, the secret root key being used to create an electronic signature of certificate information of host side equipment to which the magnetic disk drive is connected, wherein the public root key is used for authentication processing of the certificate information transmitted from the host side equipment so that the host side equipment is authenticated. In addition, characteristically, a common key is shared between the magnetic disk drive and the host side equipment that have mutually authenticated each other, and license information including a content encryption key is mutually transmitted between the magnetic disk drive and the host side equipment. In addition, characteristically, a plurality of common keys are shared between the magnetic disk drive and the host side equipment. Characteristically, a shared key for encryption of license information used when the license information is transmitted from the host side equipment to the magnetic disk drive differs from that used when the license information is transmitted from the magnetic disk drive to the host side equipment. Moreover, characteristically, the number of communication steps (data transmission) of mutual authentication between the magnetic disk drive and the host side equipment, and of sharing the shared key, is five. Furthermore, characteristically, the number of communication steps (data transmission) executed when the license information is transmitted from the host side equipment to the magnetic disk drive, or the number of communication steps (data transmission) executed when the license information is transmitted from the magnetic disk drive to the host side equipment, is at least two.

BRIEF DESCRIPTION OF THE DRAWINGS

FIG. 6 is a flowchart illustrating the process flow at the time of recording/reproduction in the conventional hard disk recorder or the like.

DETAILED DESCRIPTION OF THE INVENTION

Figure 1:
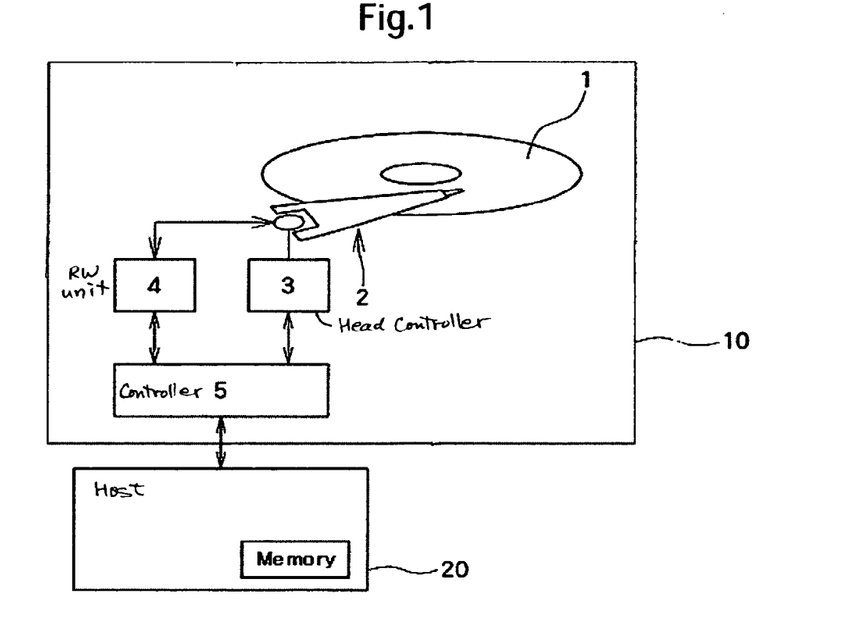
FIG. 1 is a configuration block diagram of a magnetic disk drive and an information recording system including the magnetic disk drive according to an embodiment of the present invention.

Specific embodiments of the present invention will be described with reference to the drawings. As shown in FIG. 1, a magnetic disk drive 10 according to one embodiment of the present invention comprises a disk medium 1, a head assembly 2, a head controller 3, a read/write (RW) unit 4, and a controller 5. FIG. 1 is a diagram schematically illustrating a configuration of the disk drive. In addition, this magnetic disk drive 10 is connected to host side equipment 20.

The head assembly 2 includes a magnetic head. The head assembly 2 accesses the disk medium 1 while relatively moving above a surface of the disk medium 1 so that information is magnetically recorded/reproduced (written/read) to/from the disk medium 1.

The head controller 3 controls the head assembly 2 so as to move a magnetic head unit over the disk medium 1.

The RW unit 4 encodes a signal inputted from the controller 5, and then outputs encoded information as an electric signal to a magnetic head of the head assembly 2. Moreover, this RW unit 4 decodes information that is written on the basis of an electric signal inputted from the magnetic head. Then, the RW unit 4 outputs the result of the decoding to the controller 5. Here, the RW unit 4 includes an encoder and a decoder according to this embodiment.

Figure 2:
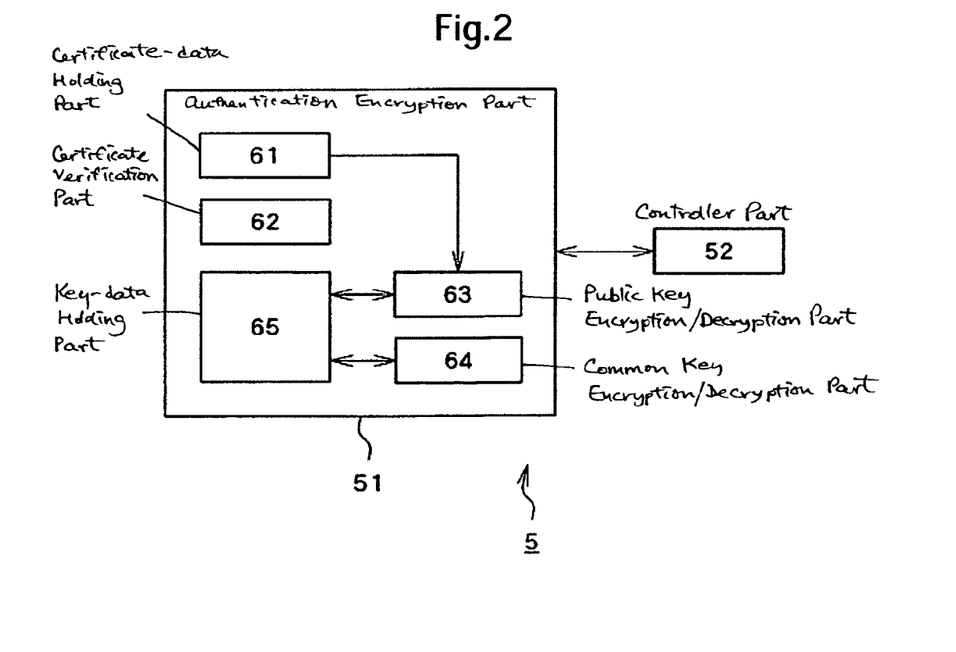
FIG. 2 is a functional block diagram illustrating a controller of the magnetic disk drive according to the embodiment of the present invention.

The controller 5 is, for example, a microprocessor. The controller 5 operates according to a program stored in a storage device (not shown). As shown in FIG. 2, this controller 5 functionally includes an authentication encryption part 51, and a controller part 52. Incidentally, at the time of writing data, the controller part 52 executes processing of outputting, to the RW unit 4, data inputted from the host side equipment 20. In addition, at the time of reading data, this controller part 52 executes processing of outputting, to the host side equipment 20, data that is read out from the disk medium 1 according to a request inputted from the host side equipment 20, and that is then output by the RW unit 4. Further, for example, at the time of request of a certificate, certificate verification processing, and encryption-key sharing processing, the controller part 52 executes processing of outputting to the authentication encryption part 51 specified information received from the host side equipment 20, or outputting to the host side equipment 20 information output by the authentication encryption part 51. Furthermore, the controller part 52 outputs a control signal to the head controller 3 so that the magnetic head is moved to a position at which target data to be written/read is written on the disk medium 1.

As shown in FIG. 2, the authentication encryption part 51 includes a certificate-data holding part 61, a certificate verification part 62, a public key encryption/decryption part 63, a common key encryption/decryption part 64, and a key-data holding part 65.

The certificate-data holding part 61 stores certificate information corresponding to a root key of a certification organization (certificate information for the magnetic disk drive; hereinafter referred to as CERT [disk]), the certificate information being set beforehand in the magnetic disk drive 10. To be more specific, this certificate information includes: public key information (KPdc[disk]) that is unique in the magnetic disk drive 10; and an electronic signature in the PKI technology. Here, the authentication encryption part 51 may also be implemented in tamper resistant hardware.

The certificate verification part 62 verifies whether or not the certificate information received from the host side equipment 20 is valid. Moreover, this certificate verification part 62 performs processing of, for example, extracting an encrypted public key KPdc[host] of the host side equipment 20, which is included in the certificate information received from the host side equipment 20, and then storing the public key in the key-data holding part 65.

The public key encryption/decryption part 63 encrypts or decrypts information by use of the public key KPdc[host] of the host side equipment 20, and a secret key Kdc[disk] corresponding to the public key KPdc[disk] of the magnetic disk drive 10. The common key encryption/decryption part 64 encrypts or decrypts data by use of a common key exchanged between the magnetic disk drive 10 and the host side equipment 20.

The key-data holding part 65 is a memory device. The key-data holding part 65 stores information including: a public key KPdc[disk] included in the certificate information of the magnetic disk drive 10; a secret key Kdc[disk] corresponding to the public key KPdc[disk]; a public key KPd[disk] that is uniquely issued in the magnetic disk drive 10; and a secret key Kd[disk] corresponding to the public key KPd[disk]. This key-data holding part 65 further stores information including: a public root key of the certification organization corresponding to a certificate of the host side equipment 20; and a public key and a common key for the host side equipment 20, which are received from the host side equipment 20.

For example, immediately after the power is turned on, the controller part 52 communicates with the host side equipment 20 to execute initial authentication operation, and then writes/reads data. In addition, when data to be written is received from the host side equipment 20, the controller part 52 executes write operation. Moreover, when data to be read is read out and is then transmitted to the host side equipment 20, the controller part 52 executes read operation. Each of the operation will be described in detail later.

The host side equipment 20 is, for example, a hard disk recorder main body. The host side equipment 20 transmits data, such as television video signals, to the magnetic disk drive 10 as data to be written so that the data is written. In this case, not only the data in question but also license information L including an identifier (content ID) of the data in question, a license identifier (license ID, LID), and a content encryption key is written in the magnetic disk drive 10. In addition, this host side equipment 20 reads out data relating to television video signals written in the magnetic disk drive 10, and decrypts a moving image on the basis of the content encryption key information included in the license information L corresponding to the data, and then outputs the moving image to, for example, a television apparatus located outside the host side equipment 20. Further, the host side equipment 20 according to this embodiment stores certificate information for the host (hereinafter referred to as CERT[host]), which is set beforehand.

Furthermore, this host side equipment 20 comprises a microcomputer module for executing processing of verifying certificate information, encryption/decryption processing that uses a public key and a secret key corresponding to the public key, and encryption/decryption processing that uses a common key. This microcomputer module may also be implemented as tamper resistant hardware.

In this embodiment, this host side equipment 20 and the magnetic disk drive 10 perform the initial authentication operation as described below so as to write/read data relating to the television video signals. To be more specific, the host side equipment 20 and the magnetic disk drive 10 execute processing shown in FIG. 3 before data is written/read (for example, when the power is turned on).

Figure 3:
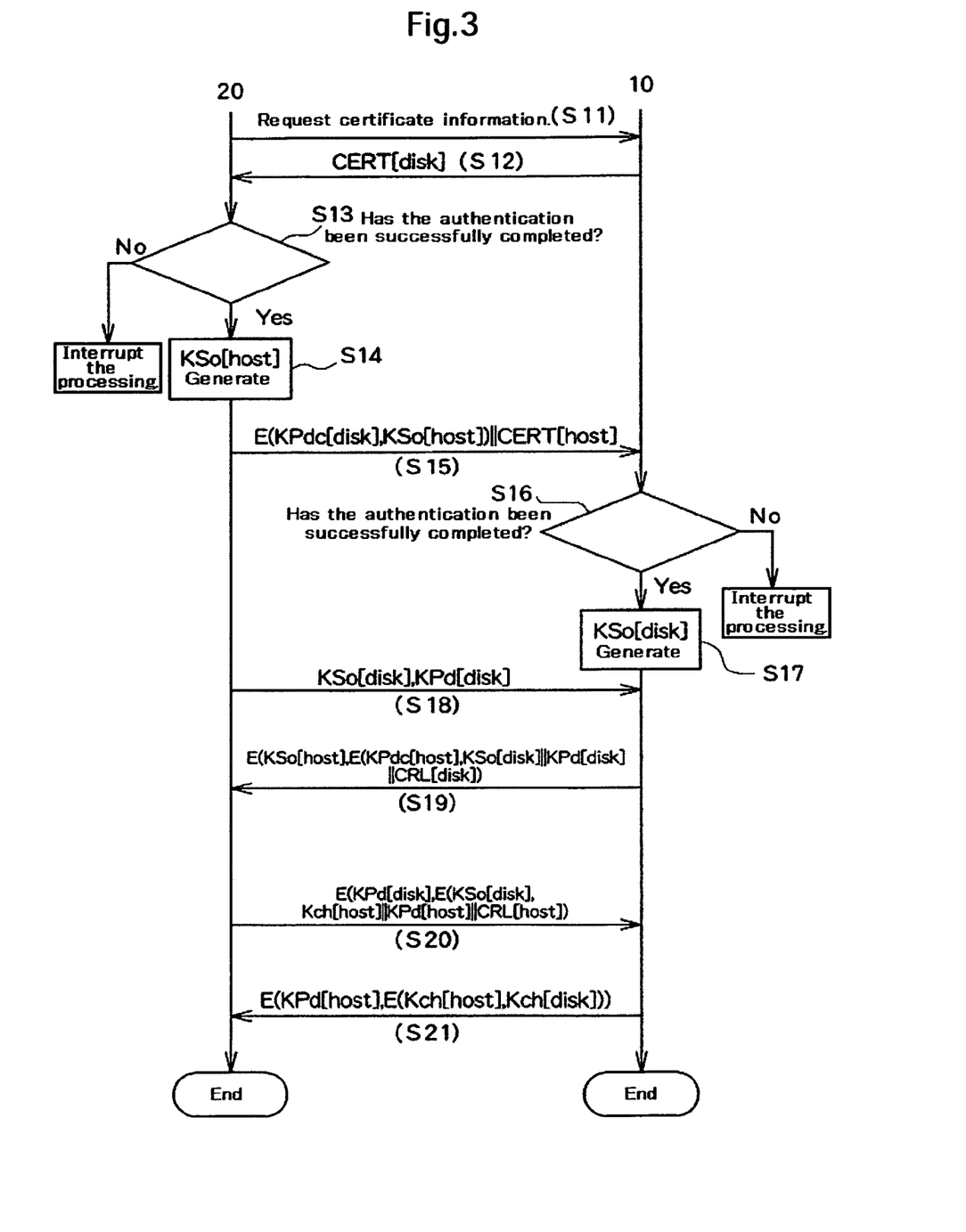
FIG. 3 is a flowchart illustrating an example of initial authentication operation performed in the information recording system according to the embodiment of the present invention.

In this processing, the host side equipment 20 first requests certificate information of the magnetic disk drive 10 (S11).

The magnetic disk drive 10 reads out certificate information for the magnetic disk drive CERT[disk], which is held by the certificate-data holding part 61, and then transmits this certificate information CERT[disk] to the host side equipment 20 (S12).

The host side equipment 20 authenticates the certificate information for the magnetic disk drive CERT[disk]. This authentication processing is performed for example by using a root key (public key) of a certification organization to verify an electronic signature made using a root key (secret key) of the certification organization. The electronic signature is included in the certificate information for the magnetic disk drive CERT[disk] in question. The root key (public key) of the certification organization should be securely stored in the key-data holding part 65 so as to prevent the root key (public key) from being tampered.

The host side equipment 20 checks whether or not the certificate information for the magnetic disk drive CERT [disk] could be successfully authenticated (S13). If it is judged that the certificate information for the magnetic disk drive CERT[disk] could not be successfully authenticated, the processing is interrupted. On the other hand, if it is judged that the certificate information for the magnetic disk drive CERT[disk] could be successfully authenticated, a first host-side common key KS0[host] is generated (S14), and then this first host-side common key KS0[host] is encrypted by use of a public key KPdc[disk] of the magnetic disk drive 10 included in the certificate information for the magnetic disk drive CERT[disk]. After that, this encrypted information is concatenated with the certificate information for the host CERT[host] to generate the following information:

E(KPdc[disk], KS0[host])‖CERT[host]

The concatenated information is transmitted to the magnetic disk drive 10 (S15). Here, E(a, b) means that b is encrypted by use of a key a; and "x‖y" means that x is concatenated with y.

The magnetic disk drive 10 authenticates the certificate information for the host CERT[host], and then checks whether or not this certificate information for the host CERT [host] could be successfully authenticated (S16). Here, if it is judged that the certificate information for the host CERT [host] could not be successfully authenticated, the processing is interrupted. On the other hand, if it is judged that the certificate information for the host CERT[host] could be successfully authenticated, the encrypted information E (KPdc [disk], KS0[host]) is decrypted using a corresponding secret key Kdc[disk], and the first host-side common key KS0[host] is acquired. The first host-side common key KS0[host] is then stored in the key-data holding part 65. In addition, the magnetic disk drive 10 generates a first magnetic-disk-side common key KS0[disk], and then stores the first magnetic-disk-side common key KS0[disk] in the key-data holding part 65 (S17).

The host side equipment 20 requests the magnetic disk drive 10 to transmit the generated first magnetic-disk-side common key KS0[disk] and a public key KPd[disk] that is uniquely set in the magnetic disk drive 10 (S18). Incidentally, in the example taken here, the magnetic disk drive 10 generates the first magnetic-disk-side common key KS0[disk] before the magnetic disk drive 10 receives the request from the host side equipment 20. However, the first magnetic-disk-side common key KS0[disk] may also be generated after the request is received from the host side equipment 20.

The magnetic disk drive 10 concatenates the first magnetic-disk-side common key KS0[disk] with the public key KPd [disk], and then encrypts the concatenated information by use of a public key KPdc[host] included in the certificate information for the host CERT[host], and further encrypts the concatenated information by use of the first host-side common key KS0[host] acquired from the host side equipment 20. Incidentally, at this time, invalidation information CRL [disk] held by the side of the magnetic disk drive 10 may also be added to the encrypted information, which has been encrypted by use of the public key KPdc [host], so that the following information is generated:

E(KS0[host], E(KPdc[host], KS0[disk]‖KPd[disk])
‖CRL[disk])

The magnetic disk drive 10 transmits the above information to the host side equipment 20 (S19).

The host side equipment 20 decrypts information received here by use of the KS0[host], and further decrypts the information by use of a corresponding secret key Kdc [host] so as to acquire and store a first magnetic-disk-side common key KS0[disk] and a public key KPd[disk].

Moreover, the host side equipment 20 generates the second host-side common key Kch[host], and then concatenates the second host-side common key Kch[host] with a public key KPd[host] that is uniquely set in the host side equipment 20 (that is to say, a public key which differs from that included in the certificate information). The host side equipment 20 encrypts the concatenated information by use of the first magnetic-disk-side common key KS0[disk], and further encrypts the concatenated information by use of a public key KPd[disk] of the magnetic disk drive 10 to generate information. Here, invalidation information CRL[host] held in the host side equipment 20 may also be added to the encrypted information, which has been encrypted by use of the first magnetic-disk-side common key KS0[disk], so that the following information is generated:

E(KPd[disk], E(KS0[disk], Kch[host]‖KPd[host])
‖CRL[host])

The host side equipment 20 transmits the above information to the magnetic disk drive 10 (S20).

The magnetic disk drive 10 decrypts this information by use of a corresponding secret key Kd[disk], and further decrypts the information by use of the KS0[disk] to acquire a second host-side common key Kch[host] generated by the host side equipment 20 and a public key KPd[host], and then stores the second host-side common key Kch[host] and the public key KPd[host] in the key-data holding part 65.

Furthermore, the host side equipment 20 requests the magnetic disk drive 10 to generate a second disk-side common key Kch[disk] (not illustrated). The magnetic disk drive 10 generates the second disk-side common key Kch[disk], and then encrypts this key by use of the second host-side common key Kch[host], and further encrypts the key by use of the host-side public key KPd[host] to generate the following information:

E(KPd[host], E(Kch[host], Kch[disk]))

Then, the magnetic disk drive 10 transmits this information to the host side equipment 20 (S21). Thus, mutual authentication between the magnetic disk drive and the host side equipment, and transmission and reception of an encryption key, and holding of the encryption key (sharing of the encryption key) are performed by five communication steps of: a first step constituted of the steps S11, S12; a second step constituted of the step S15; a third step constituted of the steps S18, S19; a fourth step constituted of the step S20; and a fifth step constituted of the step S21.

In addition, both the host side equipment 20 and the magnetic disk drive 10 store the order of the communication steps performed here (that is to say, each step in which a request is received from the host side equipment 20 and then the magnetic disk drive 10 responds to the request). If a request or a response is received in the order that differs from the stored order, it is judged at this point of time that the authentication fails, and accordingly the processing is interrupted. When processing is interrupted in this manner, reading and writing cannot be performed.

Additionally, if invalidation information CRL is mutually transmitted and received, the invalidation information CRL is checked. If authentication information on the other side is included in the invalidation information, the processing may also be interrupted at this point of time.

Next, a description will be made of processing performed when information to be written is inputted from the host side equipment 20. In this case, when data including license information is transmitted from the host side equipment 20, the controller 5 of the magnetic disk drive 10 performs the write operation described below.

Figure 4:
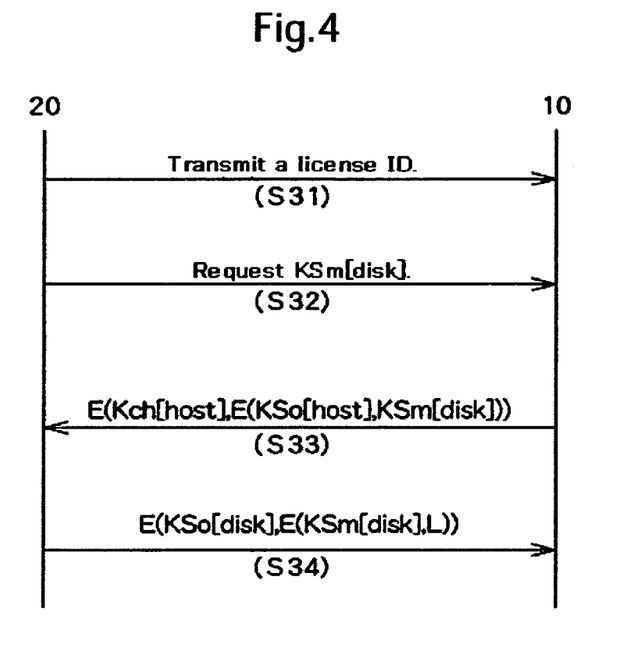
FIG. 4 is a flowchart illustrating an example of write operation performed in the information recording system according to the embodiment of the present invention.

In this case, as shown in FIG. 4, the host side equipment 20 first transmits a license ID to the magnetic disk drive 10 (S31). The magnetic disk drive 10 receives this license ID, and checks the contents thereof. Processing relating to the license ID in step S31 is performed to prevent duplicate write with the same license ID at the beginning of the transmission of target information. Accordingly, this processing may also be omitted in a system with no possibility of duplicate write.

Subsequently, the host side equipment 20 requests the magnetic disk drive 10 to generate and transmit a common key KSm[disk] that changes on a communication basis (S32). The magnetic disk drive 10 generates the common key KSm [disk] (a common key that is changed on a communication basis as follows: the first time is KS1[disk], the second time is KS2[disk], . . . ). This common key KSm[disk] is encrypted by use of the first host-side common key KS0[host], and is further encrypted by use of the second host-side common key Kch[host], before the encrypted common key is transmitted to the host side equipment 20 (S33).

Upon receiving the information E(Kch[host], E(KS0 [host], KSm[disk])), the host side equipment 20 decrypts this information by use of Kch[host], and further decrypts the decrypted information by use of KS0[host] to acquire KSm [disk]. Then, license information L is encrypted by use of this KSm[disk], and is further encrypted by use of the first disk-side common key KS0[disk] to generate information E(KS0 [disk], E(KSm[disk], L)). The information thus generated is transmitted to the magnetic disk drive 10 (S34).

As described above, the license information L is information that changes at specified time intervals (for example, at intervals of one minute). Information of the contents cannot be read without using this license information L. The magnetic disk drive 10 decrypts information received here by use of KS0[disk], and further decrypts the information by use of KSm[disk] to acquire the license information L. Then, the magnetic disk drive 10 checks this license information L, and securely stores the license information L in the magnetic disk drive 10 so that the license information L is not easily tampered. Examples of a component to store the license information L therein include the authentication encryption part 51 and the disk medium 1. For the information of contents associated with the license information L, data that is inputted from the host side equipment 20 is written to a specified location on the disk medium 1 in the magnetic disk drive 10, as normal data write processing. The order of writing the license information L and the information of the contents associated with the license information L, and the timing, may be arbitrarily determined.

Figure 5:
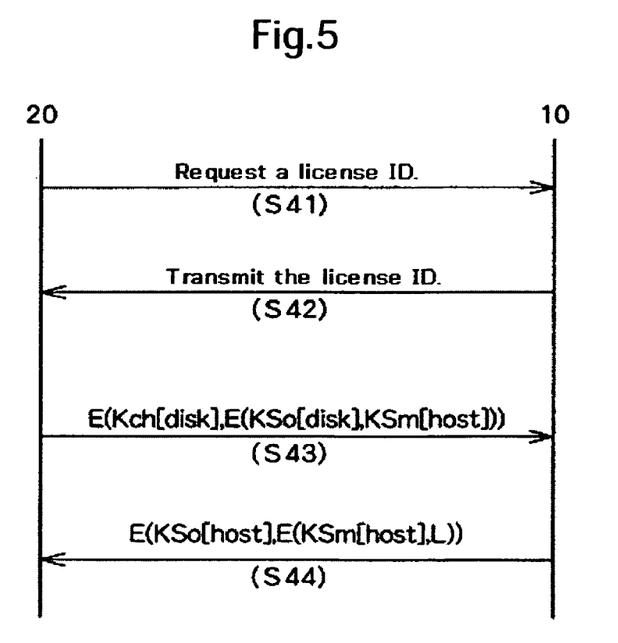
FIG. 5 is a flowchart illustrating an example of read operation performed in the information recording system according to the embodiment of the present invention.

When the magnetic disk drive 10 reads out data to be read and then transmits the data to the host side equipment 20, the read operation is performed as described below. As shown in FIG. 5, the host side equipment 20 first requests a license ID of data to be read (S41). In response to the request, the magnetic disk drive 10 reads out a corresponding license ID from a specified location at which the license ID is written, and then outputs the license ID (S42). The steps S41 and S42 of transmitting this license ID are provided to check at the beginning of the processing whether or not target license information L exists in the magnetic disk drive 10. Accordingly, if the check is made by another method, or the check is eventually made by license information L received by the host side equipment 20, the steps S41 and S42 may also be omitted.

Subsequently, the host side equipment 20 generates a common key KSm[host] that changes on a communication basis (to be more specific, a common key that is changed on a communication basis as follows: the first time is KS1 [host], the second time is KS2[host], . . . ). This common key KSm [host] is encrypted by use of the first disk-side common key KS0 [disk], and is further encrypted by use of the second disk-side common key Kch [disk], before the encrypted common key is transmitted to the magnetic disk drive 10 (S43).

Upon receiving the information E(Kch[disk], E(KS0 [disk], KSm[host])), the magnetic disk drive 10 decrypts this information by use of Kch [disk], and further decrypts it by use of KS0[disk] to acquire KSm[host]. In addition, the magnetic disk drive 10 reads out the license information L. Then, this license information L is encrypted by use of KSm[host], and is further encrypted by use of the first host-side common key KS0[host] to generate the information E(KS0[host], E(KSm [host], L)). The magnetic disk drive 10 transmits this information to the host side equipment 20 (S44).

The host side equipment 20 decrypts information received here by use of KS0 [host], and further decrypts the information by use of KSm[host] to acquire the license information L. Moreover, the magnetic disk drive 10 reads out the information of the contents associated with the license information L from a specified location on the disk medium 1, as normal data read processing, and then transmits the data thus read out to the host side equipment 20. The order of reading out the license information L and the information of the contents associated with the license information L, and the timing, may be arbitrarily determined. The host side equipment 20 decrypts, by use of the license information L received from the magnetic disk drive 10, data of the contents read out from the magnetic disk drive 10 to acquire a read signal. The host side equipment 20 then outputs the read signal to a television apparatus, or the like, so that the read signal is reproduced.

Incidentally, if write and read are simultaneously made, the recording operation shown in FIG. 4 and the read operation shown in FIG. 5 are alternately performed. In this embodiment, the authentication is performed beforehand, and the license information L is transmitted and received between the magnetic disk drive 10 and the host side equipment 20 by use of a common key that is held at this point of time as a result of exchange. Therefore, the need for the authentication performed every time switching between writing and reading is made is eliminated. As a result, as compared with the conventional method shown in FIG. 6, it is possible to reduce a processing load even in a mode of, for example, reproduction while recording.

To be more specific, in the processing shown in FIGS. 4 and 5, basic communications are completed by the two communication steps S33 and S34 and the two communication steps S43 and S44, respectively.

In addition, even at the time of mutual authentication and key-sharing that are initially performed, communication steps are reduced. Accordingly, the processing load is further reduced. Moreover, a shared key for encryption used when the license information L is transmitted from the host side equipment 20 to the magnetic disk drive 10 differs from that used when the license information L is transmitted in the reverse direction from the magnetic disk drive 10 to the host side equipment 20. Therefore, the security is sufficiently ensured also from the viewpoint of the data security. It is to be noted that in the embodiment of the present invention, the combination of the encryption keys and the steps of encryption and decryption are described as one example. The encryption methods, combinations of keys, application steps of encryption and decryption, the number of times of encryption and decryption may be modified as necessary for application. Furthermore, because the magnetic disk drive 10 and the host side equipment 20 mutually performs authentication processing before transmitting the license information L, it is also possible to remove the magnetic disk drive 10 from the host side equipment 20 so as to use the magnetic disk drive 10 as a removable disk drive.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. An information recording system comprising a magnetic disk drive and host side equipment, wherein:
    said magnetic disk drive comprises a storage unit to store first certificate information corresponding to a root key of a certification organization;
    said host side equipment acquires the first certificate information stored in the magnetic disk drive to authenticate the magnetic disk drive on the basis of the first certificate information, and then transmits, to the magnetic disk drive, second certificate information that is set beforehand in the host side equipment;
    said magnetic disk drive authenticates the host side equipment by use of the second certificate information of the host side equipment; and
    wherein:
        the host side equipment and the magnetic disk drive mutually authenticate one another before transmitting license information,
        the license information corresponds to encrypted data stored on the magnetic disk drive, and wherein the license information changes at predetermined intervals relative to portions of the data,
        a plurality of shared encryption keys are stored in the magnetic disk drive and the host side equipment,
        a first encryption key of the plurality of shared encryption keys differs from a second encryption key of the plurality of shared encryption keys; wherein the first encryption key encrypts the information relating to the license of data when the information relating to the license of data is written to the magnetic disk drive, and the second encryption key encrypts the information relating to the license of data when the information relating to the license of data is read from the magnetic disk drive.

2. The information recording system according to claim 1, wherein:
    before writing/reading data, the magnetic disk drive and the host side equipment mutually exchange one or more of the plurality of shared encryption keys, and store the respective encryption key; and at the time of writing/reading the data, the magnetic disk drive and the host side equipment transmit/receive encrypted data by use of the stored encryption key.

3. The information recording system according to claim 1, wherein:
    the order of transmission/reception is specified beforehand in the first and second certificate information used between the magnetic disk drive and the host side equipment; and
    if the first and second certificate information is received in the order that differs from the specified order of transmission/reception, each of the magnetic disk drive and host side equipment judges that the authentication has failed, and consequently interrupts the processing.

4. The information recording system according to claim 3, wherein:
    the order of transmission/reception is specified beforehand in the first and second certificate information used between the magnetic disk drive and the host side equipment; and
    if the first and second certificate information is received in the order that differs from the specified order of transmission/reception, each of the magnetic disk drive and host side equipment judges that the authentication has failed, and consequently interrupts the processing.

5. The information recording system according to claim 3, wherein:
    the number of communication steps of performing mutual authentication between the magnetic disk drive and the host side equipment, and of transmitting/receiving the encryption key for storage, is five.

6. The information recording system according to claim 3, wherein:
    at the time of writing data, information relating to a license of the data is transmitted from the host side equipment to the magnetic disk drive, whereas at the time of reading data, information relating to a license of the data is transmitted from the magnetic disk drive to the host side equipment.

7. The information recording system according to claim 3, wherein:
    at the time of writing data, information relating to a license of the data is transmitted from the host side equipment to the magnetic disk drive, whereas at the time of reading data, information relating to a license of the data is transmitted from the magnetic disk drive to the host side equipment; and
    the number of communication steps of transmitting the information relating to the license of the data from the host side equipment to the magnetic disk drive is two, and the number of communication steps of transmitting the information relating to the license of the data from the magnetic disk drive to the host side equipment is two.

8. The information recording system according to claim 3, wherein:
    the host side equipment requests the first certificate information of the magnetic disk drive;
    the magnetic disk drive reads out the first certificate information of the magnetic disk drive held in a certificate-data holding part of the magnetic disk drive and transmits the first certificate information to the host side equipment.

9. The information recording system according to claim 8, wherein:

the host side equipment authenticates the first certificate information of the magnetic disk drive if the first certificate information can be authenticated; and subsequently generates a first host-side common key, encrypts the first host-side common key using a public key of the magnetic disk drive included in the first certificate information of the magnetic disk drive, concatenate the encrypted first host-side common key with the second certificate information of the host side equipment, and transmits the concatenated information to the magnetic disk drive.

10. The information recording system according to claim 9, wherein:
the magnetic disk drive receives the second certificate information of the host side equipment contained in the concatenated information from the host side equipment and authenticates the second certificate information of the host side equipment if the certificate second information can be authenticated; and subsequently decrypts the encrypted first host-side common key using a private key of the magnetic disk drive which corresponds to the public key of the magnetic disk drive so as to obtain the first host-side common key, stores the first host-side common key in a key-data holding part of the magnetic disk drive, generates a first magnetic-disk-side common key, and stores the first magnetic-disk-side common key in the key-data holding part.

11. The information recording system according to claim 10, wherein:
the host side equipment requests the magnetic disk drive to transmit the generated first magnetic-disk-side common key and a uniquely set public key uniquely set in the magnetic disk drive.

12. The information recording system according to claim 11, wherein:
the magnetic disk drive concatenates the first magnetic-disk-side common key with the uniquely set public key, encrypts the concatenated information by use of a host public key included in the second certificate information of the host side equipment, and further encrypts the concatenated information by use of the first host-side common key acquired from the host side equipment, and transmits the encrypted information to the host side equipment.

13. The information recording system according to claim 12, wherein:
the magnetic disk drive adds invalidation information held in the magnetic disk drive to the encrypted information.

14. The information recording system according to claim 12, wherein:
the host side equipment decrypts the encrypted information from the magnetic disk drive by use of the first host-side common key, and further decrypts the encrypted information by use of a host secret key which corresponds to the host public key, so as to acquire the first magnetic-disk-side common key and the uniquely set public key of the magnetic disk drive, and stores the first magnetic-disk-side common key and the uniquely set public key of the magnetic disk drive.

15. The information recording system according to claim 14, wherein:
the host side equipment generates a second host-side common key, concatenates the second host-side common key with a uniquely set host public key which is uniquely set in the host side equipment, encrypts the concatenated information by use of the first magnetic-disk-side common key, and further encrypts the concatenated information by use of the uniquely set public key of the magnetic disk drive, and transmits the encrypted information to the magnetic disk drive.

16. The information recording system according to claim 15, wherein:
the host side equipment adds invalidation information held in the host side equipment to the encrypted information.

17. The information recording system according to claim 16, wherein:
the magnetic disk drive decrypts the encrypted information from the host side equipment by use of a secret key which corresponds to the uniquely set public key of the magnetic disk drive, and further decrypts the encrypted information by use of the first magnetic disk-side common key, so as to acquire the second host-side common key and the uniquely set host public key, and stores the second host-side common key and the uniquely set host public key in the key-data holding part.

18. The information recording system according to claim 17, wherein:
the host side equipment requests the magnetic disk drive to generate a second disk-side common key;
the magnetic disk drive generates the second disk-side common key, encrypts the second disk-side common key by use of the second host-side common key, and further encrypts the second disk-side common key by use of the uniquely set host public key, and transmits the encrypted information to the host side equipment.

* * * * *

UNITED STATES PATENT AND TRADEMARK OFFICE
CERTIFICATE OF CORRECTION

| | |
|---|---|
| PATENT NO. | : 8,065,516 B2 |
| APPLICATION NO. | : 11/528958 |
| DATED | : November 22, 2011 |
| INVENTOR(S) | : Watanabe et al. |

It is certified that error appears in the above-identified patent and that said Letters Patent is hereby corrected as shown below:

In Claims:

In Claim 4, at Column 10, Line 18, please delete "3" and insert --2-- therefor;
In Claim 5, at Column 10, Line 29, please delete "3" and insert --2-- therefor;
In Claim 6, at Column 10, Line 35, please delete "3" and insert --2-- therefor;
In Claim 7, at Column 10, Line 43, please delete "3" and insert --2-- therefor;
In Claim 8, at Column 10, Line 57, please delete "3" and insert --2-- therefor.

Signed and Sealed this
Twentieth Day of March, 2012

David J. Kappos
*Director of the United States Patent and Trademark Office*